United States Patent
Boehme et al.

(10) Patent No.: US 9,354,844 B2
(45) Date of Patent: May 31, 2016

(54) METHOD AND APPARATUS FOR ITERATIVELY CALCULATING A VALUE

(71) Applicant: Intel Mobile Communications GmbH, Neubiberg (DE)

(72) Inventors: Andreas Boehme, Schorndorf (DE); Andreas Menkhoff, Oberhaching (DE)

(73) Assignee: Intel Deutschland GmbH, Neubiberg (DE)

( * ) Notice: Subject to any disclaimer, the term of this patent is extended or adjusted under 35 U.S.C. 154(b) by 371 days.

(21) Appl. No.: 13/709,450

(22) Filed: Dec. 10, 2012

(65) Prior Publication Data

US 2014/0164461 A1    Jun. 12, 2014

(51) Int. Cl.
*G06F 7/544* (2006.01)
*G06F 7/548* (2006.01)

(52) U.S. Cl.
CPC .............. *G06F 7/548* (2013.01); *G06F 7/5446* (2013.01)

(58) Field of Classification Search
CPC .................................................... G06F 7/5446
USPC .............................. 708/4, 274–276, 440–442
See application file for complete search history.

(56) References Cited

U.S. PATENT DOCUMENTS

| | | | |
|---|---|---|---|
| 7,545,878 B1 * | 6/2009 | Hall et al. | 375/285 |
| 8,572,150 B1 * | 10/2013 | Dick | 708/441 |
| 2010/0008214 A1 | 1/2010 | Siaud et al. | |
| 2013/0335853 A1 * | 12/2013 | Li et al. | 360/75 |

FOREIGN PATENT DOCUMENTS

| | | |
|---|---|---|
| CN | 1492313 A | 4/2004 |
| CN | 101667112 A | 3/2010 |
| CN | 101908123 A | 12/2010 |

* cited by examiner

*Primary Examiner* — Andrew Caldwell
*Assistant Examiner* — Calvin M Brien
(74) *Attorney, Agent, or Firm* — Eschweiler & Associates, LLC

(57) ABSTRACT

A method and an apparatus are described which determine at least one output value based on at least one input value. The input value is provided to a processing unit, wherein a combination of intermediate values is iteratively calculated. Each intermediate value is calculated during an iteration such that the intermediate value for each iteration is buffered, using a buffer storage. Based on the combination of the buffered intermediate values a storage is accessed, the storage storing a plurality of first output values, each first output value associated with a respective combination of the buffered intermediate values, so that the first output value is output.

18 Claims, 10 Drawing Sheets

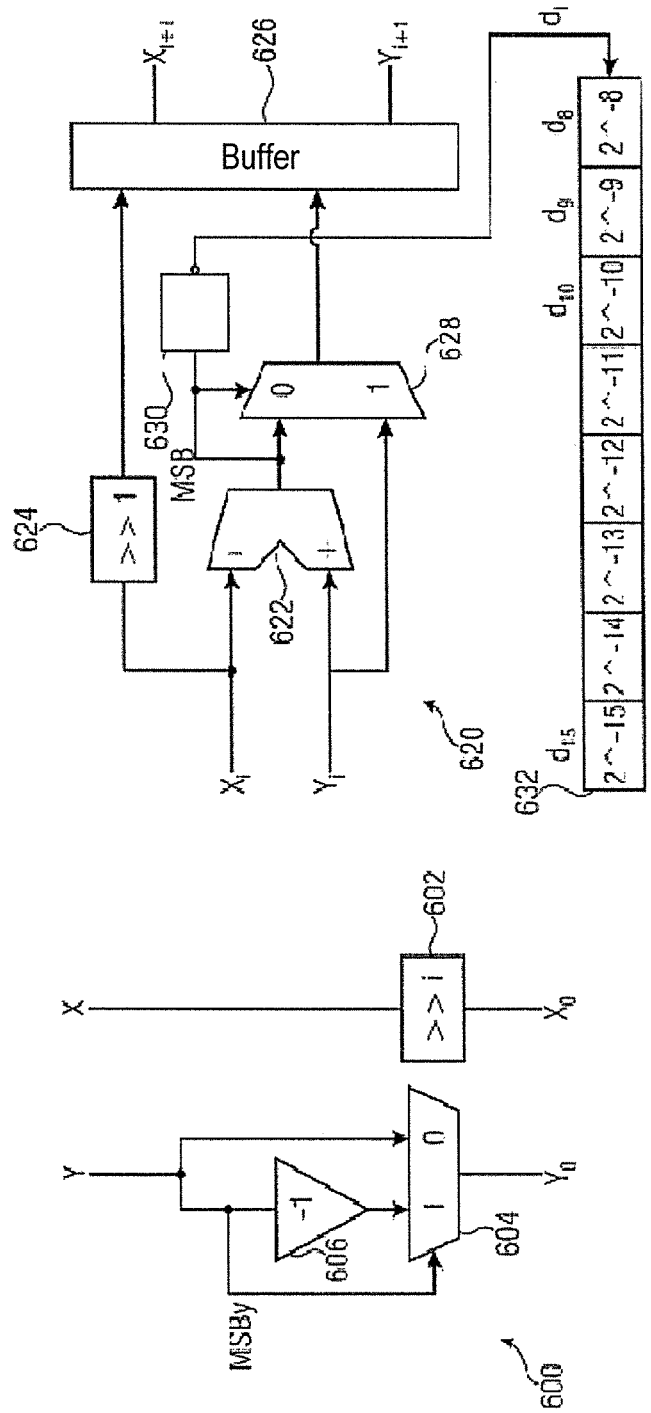

METHOD AND APPARATUS FOR ITERATIVELY CALCULATING A VALUE

FIELD

The present disclosure is related to wireless communications, and in particular, is related to a polar transmitter apparatus and method.

BACKGROUND

In the field of wireless telecommunication, polar transmitter architectures are known which may be used to decompose an input signal from the baseband into a magnitude signal and a phase signal, which are subjected to an envelope modulation and a phase modulation, respectively, and then combined and amplified by a power amplifier. Polar transmitters use processors for performing a rectangular-to-polar conversion of the input signal which may be an I/O signal. By means of the rectangular-to-polar conversion, the input signal is represented in its polar coordinates. The polar transmitter may use a cordic (coordination rotation digital computer) processor receiving the I/O input signal and outputting the polar signal. Digital transmitters including a cordic processor may operate at high frequencies and with high accuracy. This results in a high power consumption which will significantly increase with an increase of the clock frequency at which the cordic algorithm operates, for example, when the required clock frequency is increased in future wireless networks.

Computing devices may require the processing of data which may represent a signal in Cartesian coordinates. On the basis of such a signal it may be desired to calculate a trigonometric function. Such an operation may take place in a processor, a graphical processor and/or a mathematical coprocessor of the computing device, like a desktop computer, a laptop, a smart phone. In such environments, the cordic algorithm may be implemented, for example directly in hardware, for performing operations like addition, subtraction or bit shifting. For determining the polar coordinates on the basis of a rectangular input signal, the cordic algorithm calculates iteratively both the magnitude and the angle of the resulting vector using a "magnitude path" and an "angle" path. A significant amount of hardware elements is required for implementing the operations mentioned above which, in turn, results in a higher power consumption of the device and/or may increase latencies in case signals are processed along the respective paths at different speeds so that before entering a new iteration, a latency is introduced until all signals in the different paths have been processed for the current iteration.

SUMMARY

A method and an apparatus for determining at least one output value on the basis of at least one input value is disclosed. The input value is provided to a processing unit, wherein a combination of intermediate values is iteratively calculated. Each intermediate value is calculated during an iteration such that the intermediate value for each iteration is buffered, using a buffer storage. Based on the combination of the buffered intermediate values a storage is accessed, the storage storing a plurality of first output values, each first output value associated with a respective combination of the buffered intermediate values, so that the first output value is output.

BRIEF DESCRIPTION OF THE DRAWINGS

FIG. 6A shows an intermediate processing stage for coordinate values output by the first stage of the apparatus of FIG. 3;

FIG. 6B shows an example iteration block used in the second stage of the apparatus of FIG. 3;

DETAILED DESCRIPTION

Figure 1:
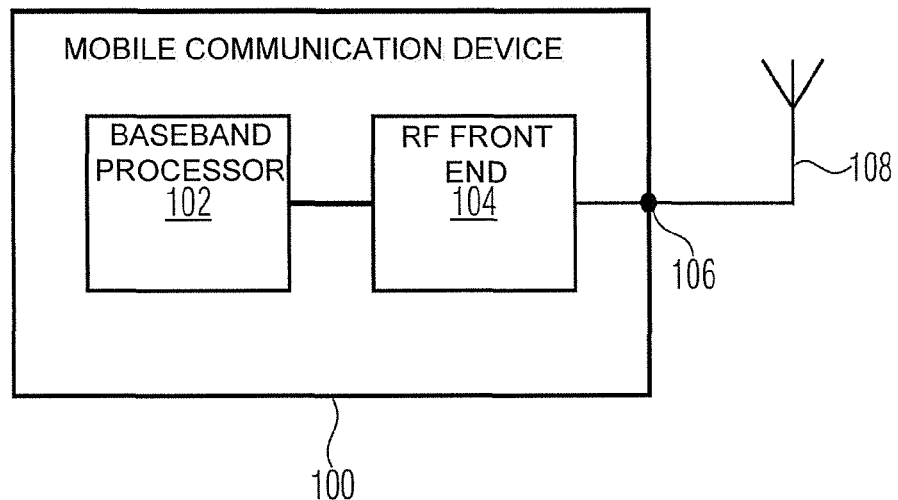
FIG. 1 shows a block diagram of an example mobile communication device.

FIG. 1 shows a block diagram of an example mobile communication device 100 comprising a digital baseband processor 102, and an RF front end 104 coupled to the baseband processor 102 and to an antenna port 106. The antenna port 106 is provided to allow connection of an antenna 108 to the mobile communication device 100. The baseband processor 102 generates signals to be transmitted via the antenna 108 which are forwarded to the RF front end 104 for generating a transmit signal output to the antenna port 106 for transmission via the antenna 108. The RF front end 104 may also receive signals via the antenna port 106 from the antenna 108 and provides respective signals to the baseband processor 102 for processing the received signals. The apparatus and the method described in further detail in the following may be implemented, in one embodiment, in the baseband processor 102, for example in a processor operating on data signals for generating the respective input signals to the RF front end 104, and/or in the RF front end 104, like in a polar transmitter used for generating the transmit signal output at the antenna port 106 on the basis of inputs signals received from the baseband processor.

The mobile communication device 100 may be a portable mobile communication device in one embodiment and may be configured to perform a voice and/or data communication according to a mobile communication standard with other communication devices, like other mobile communication devices or base stations of a mobile communication network. Mobile communication devices may comprise a mobile handset, such as a mobile phone or a smart phone, a tablet PC, a broadband modem, a laptop, a notebook, a router, a switch, a repeater or a PC. Also, the mobile communication device 100 may be a base station of a communication network.

Figure 2:
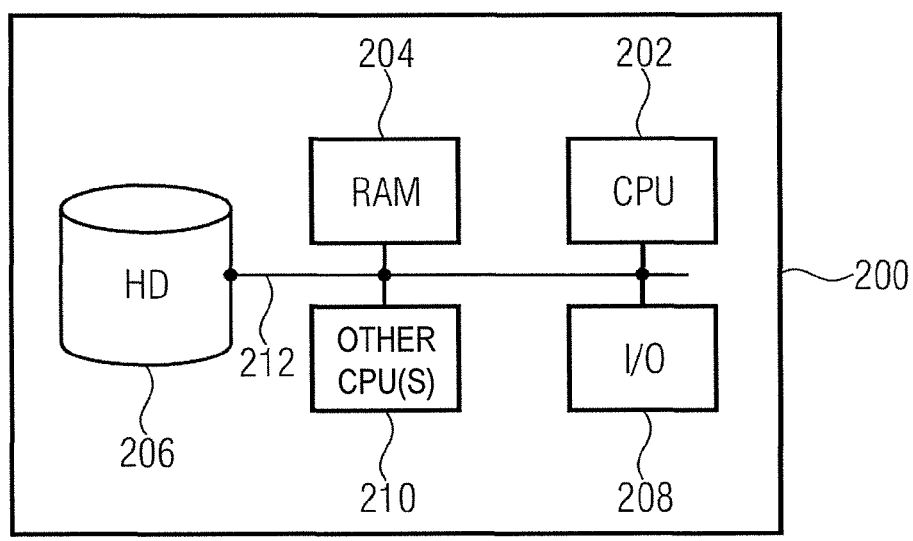
FIG. 2 shows a schematic representation of a computing device.

FIG. 2 shows a schematic representation of a computing device 200 including a CPU 202, a volatile memory 204, for example a RAM, and a non-volatile memory 206, for example a hard disc. Block 208 indicates input/output elements/ports of the computing device 200 and block 210 illustrates optional processors that may be provided, for example additional CPUs or additional coprocessors like graphical or mathematical coprocessors. The above elements are connected via a bus 212 for allowing communication among the respective entities. The apparatus and the method described in further detail in the following may be used for carrying out specific operations with regard to data processed by the computing device 200, for example by a CPU. It may be desired to calculate specific trigonometric functions by the CPU 202 or by one or more of the other optional CPUs 210. The computing device 200 shown in FIG. 2 may be a personal computer, a notebook computer, a laptop computer, a tablet computer, a PDA, a smart phone or a cell phone. Also, the computing device 200 may be part of any of the above mentioned mobile devices requiring data processing.

Figure 3:
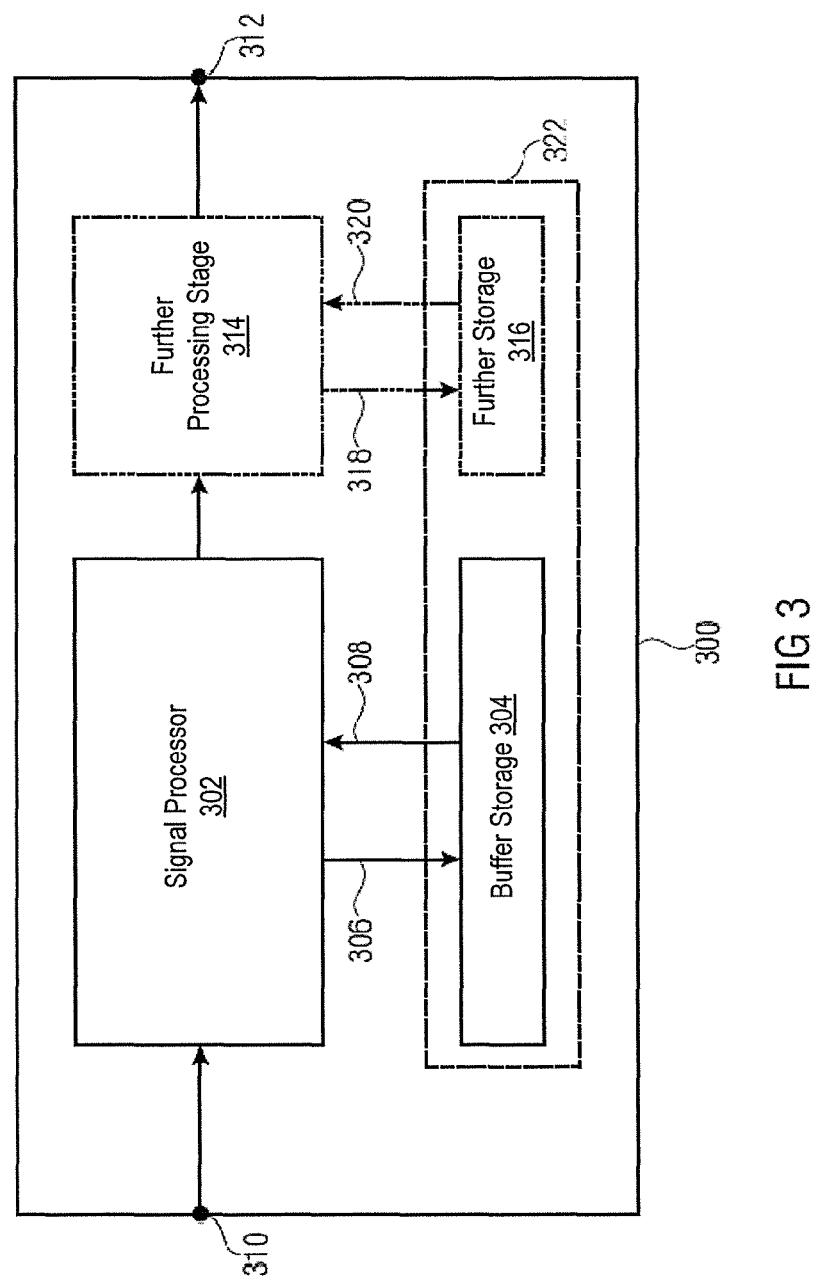
FIG. 3 shows a block diagram of an example apparatus for determining polar coordinates of an input vector.

FIG. 3 is a block diagram of an example apparatus 300 for determining polar coordinates of an input vector. The apparatus 300 comprises a signal processor 302 and a storage 304 coupled to the signal processor 302. The signal processor may access the storage 304, as is schematically represented by arrow 306, and the storage 304 may provide a signal to the signal processor 302, as is schematically represented by arrow 308. The signal processor 302 is further coupled to an input port 310 and to an output port 312 for receiving an input signal via the input port 310 and for providing an output signal via the output port 312. The input signal received at input port 310 is represented in Cartesian coordinates and is provided to the signal processor 302 which determines the polar coordinates of an input vector described by the input signal. The signal processor 302 implements an algorithm, for example a modified vector mode cordic algorithm (see below), and iteratively turns the input vector using a number of iterations. After performing this predetermined number of iterations it can be assumed that one of the Cartesian coordinates, for example the y-coordinate, is, for example, zero. The other one of the Cartesian coordinates, for example the x-coordinate, represents the radial coordinate of the input vector. During each iteration, a rotation direction value is set dependent on the direction into which the input vector is turned, for generating a set of rotation direction values, for example a binary word indicating by its respective values of one or zero as to whether the input vector, during an iteration, had been turned clockwise or counter clockwise. After the iterations, on the basis of the set of rotation direction values, the signal processor accesses the storage 304 which holds a plurality of angles or angular coordinates. Each of the angular coordinates has associated therewith a different set of rotation direction values so that when accessing the storage 304 by means of the generated set of rotation direction values an associated angular coordinate will be output to the signal processor which will then output the polar coordinates at the output port 312, namely the determined radial coordinate and the determined angular coordinate. The predefined range may be set dependent on a desired accuracy with which the radial coordinate of the input vector is to be determined. During the iterations, the respective angles by which the input vector is turned are decreased for each iteration. The Cartesian coordinates and the polar coordinates may be given in a binary format.

In case it is desired to provide an even more accurate version of the angular coordinate, the apparatus 300 may comprise a further processing stage 314 that receives from the signal processor 302 the radial coordinate and the angular coordinate or angle. The second stage 314 may receive from the signal processor the values of the respective Cartesian coordinates after all iterations have been completed in the signal processor 302. On the basis of the coordinates of the turned vector, the remaining angle or angular coordinate of the turned input vector is calculated and then added to the angular coordinate that has been obtained by the signal processor 302 from the storage 304. Stage 314 may be provided for calculating the remaining angular coordinate using an iterative quasi division on the basis of the Cartesian coordinates of the turned input vector. During each iteration an access value is generated in the second stage 314 so that, after all iterations for the quasi division have been completed, a set of access values or an access value word is formed which can be used for accessing a further storage 316 indicated in dotted lines in FIG. 3. The access word may be applied to the storage 316, as is schematically shown by arrow 318, for accessing the storage which returns to the second stage 314 an associated remaining angular coordinate as is depicted at arrow 320. The storage 316 includes a plurality of remaining angle or angular coordinates each associated with a different set of access values. The retrieved remaining angular coordinates may then be added to the angular coordinate retrieved from storage 304 by a signal processor 302 so that the final angular coordinate may be output together with the radial coordinate at the output port 312.

It is noted that in FIG. 3, the storages 304 and 316 are depicted as separate entities, for example, as separate storage elements or storage devices. However, they may also be formed by a common storage element 322 comprising different areas 304 and 316 that can be accessed independently by the signal processor 302 and the second stage 314. Alternatively, the signal processor 302 and/or the second stage 314 may include one or more storage areas for holding the respective angular coordinates as mentioned above.

Figure 4:
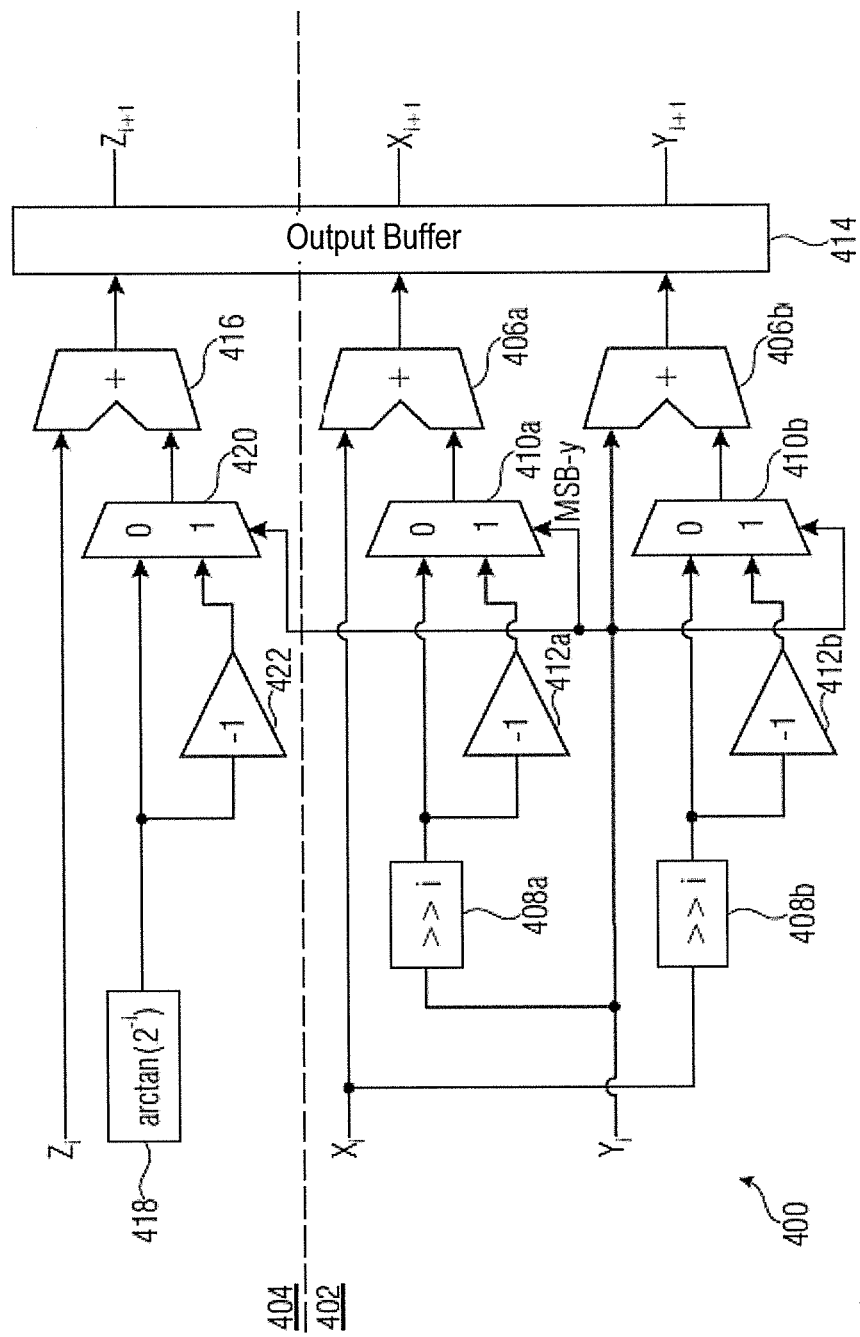
FIG. 4 shows a conventional iteration block of a cordic algorithm operating in the vector mode.

In the following, example signal processing blocks of the apparatus 300 will be described in further detail. A "modified" cordic algorithm operating in the vector mode is used. FIG. 4 shows a conventional iteration block of a cordic algorithm operating in the vector mode. The iteration block 400 includes a magnitude path 402 and an angle path 404. The magnitude path 402 receives, in binary format, the x-coordinate $X_i$ and the y-coordinate $Y_i$ from the preceding iteration. At the start of the iterations, the initial x-coordinate and y-coordinate describing the input vector to be rotated are provided as inputs. $X_i$ and $Y_i$ are input into respective adders 406a, 406b. In addition, $Y_i$ is input into the bit shifter 408a shifting the binary representation of $Y_i$ by a number of digits to the right which is determined by the number of the iteration i. The output signal from the bit shifter 408a is applied to the demultiplexer 410a and, in addition, an inverted version of the output signal from the shifter 408a is applied to the multiplexer 410a via the inverter 412a. On the basis of the value of the most significant bit of $Y_i$, one of the signals applied to the multiplexor 410a is selected and applied to the adder 406a. In a similar way, $X_i$ is applied to the bit shifter 408b, the output of which is applied to the multiplexer 410b directly and via the inverter 412b. Again, the output of the multiplexer 410b is selected by the most significant bit of $Y_i$ and is applied to the adder 406b. The adders 406a and 406b output the processed input values $X_{i+1}$ and $Y_{i+1}$ that are used as inputs for the next iteration stage. The output values from the adders 406a and 406b may be buffered in an output buffer 414.

The angle path 404 receives the input value $Z_i$ which, in the vector mode, has an initial value of zero. The value $Z_i$ is applied to the adder 416. In addition, by means of block 418 the value of $\arctan(2^{-i})$ is calculated (i being the number of the iteration, i starting at zero) and the result of the calculation in block 418 is applied to the multiplexer 420 directly and via the inverter 422. The output of block 418 or the inverted output thereof is selected by means of the multiplexer 420 dependent on the most significant bit $Y_i$. The output of the multiplexer 420 is input into the adder 416 generating the $Z_{i+1}$ value for the next iteration that is also stored or buffered in the buffer 414. The iteration block 400 depicted in FIG. 4 operates as is well known in the art and as can be derived from the respective operational blocks described above, so that a more detailed description of the functionality of a cordic iteration block is omitted.

As can be seen from FIG. 4, two paths are required, the magnitude path 402 and the angle path 404 for implementing the conventional vector mode cordic algorithm. The angle path 404 requires calculating arctan(y/x) so that in addition to operating blocks 416, 420 and 422 additional blocks for implementing the function arctan(y/x) are needed.

Figure 5:
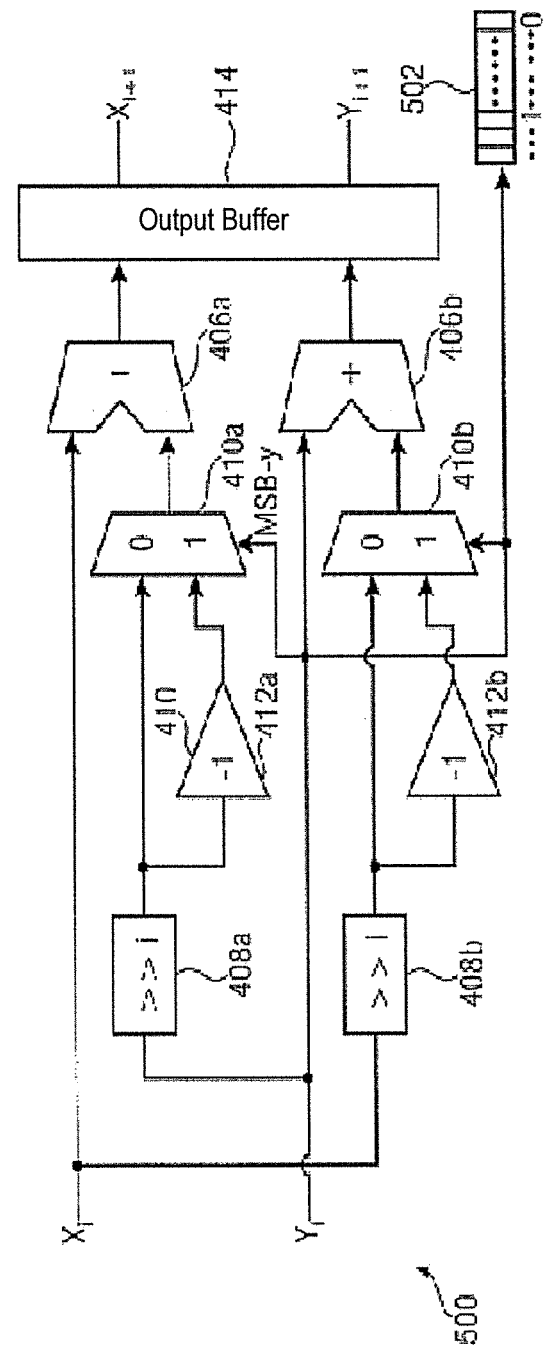
FIG. 5 shows an example modified cordic iteration block of an apparatus for determining polar coordinates of an input vector.

The modified algorithm does not use the conventional iteration block as it is depicted in FIG. 4, rather, a modified cordic iteration block is used. FIG. 5 shows an example modified cordic iteration block. In FIG. 5, elements already described with regard to FIG. 4 have the same reference signs associated therewith. As can be seen from FIG. 5, the modified cordic iteration block corresponds substantially to the magnitude path 402 shown in FIG. 4, i.e., the angled path 404 of a conventional cordic iteration block is omitted. In other words, the modified cordic algorithm may operate only on the basis of the x- and y-coordinates. The modified cordic iteration block 500 shown in FIG. 5 differs from the magnitude path 402 of FIG. 4 in that the most significant bit of $Y_i$ is output to a buffer 502 storing for each iteration the most significant bit of $Y_i$. After all iterations of the modified cordic algorithm are completed, the buffer 502, which may be part of the signal processor depicted in FIG. 3, holds a set of values or a word defined by the respective most significant bits of $Y_i$ of the respective iterations. This set or word may be used to access the storage described above, which holds respective angles for each of the possible combinations of the most significant bits in the different iterations.

Thus, when implementing the modified cordic algorithm, the angle path can be omitted, and it is only necessary to provide, in addition to the magnitude path, the buffer 502 and an additional storage element holding the respective angular coordinates or angle so that the overall number of elements and signal processing elements can be reduced. Also the current consumption can be significantly decreased when using the modified cordic iteration block as depicted in FIG. 5. For example, considering conventional polar transmitters using conventional cordic processors operating at a clock frequency of 104 MHz, the current consumption is in the range of several milliamperes. When increasing the clock frequency, for example up to 1.3 GHz, the current consumption is estimated to be 13 times higher. It has been found out that when applying the modified cordic iteration block as depicted in FIG. 5, the current consumption can be reduced in the vector mode by about 40%. This is achieved by the modified cordic iteration block shown in FIG. 5. It has been found that the radial coordinate or X already saturates before all iterations (for rotating Y is rotated towards zero) of the conventional cordic are completed, e.g. after half of the iterations. Instead of calculating the Z value, the desired angle is obtained by accumulating the respective most significant bits of the y-coordinate and accessing a storage, like a table, holding the respective angles for the different accumulated values. Thus, the signal processor depicted in FIG. 3, when implementing the modified vector mode cordic algorithm only needs to implement half of the iterations of the conventional cordic iteration. The overhead associated with calculating the angle can be reduced as the angle is determined on the basis of a table including all possible rotations (when considering 8 iterations, 256 rotations are possible). The subsequent MSB of Y indicates the rotation, i.e. whether it is clockwise or counterclockwise and are used as an address for the table for which one obtains the rotation angle.

As described above with regard to FIG. 3, it may be desired that the angle coordinate determined by the iteration block 500 is determined in further accuracy using the second stage (see stage 314 in FIG. 3). For the second stage, it is assumed that the radius has already converged and does not need further calculation. In the second stage instead of calculating arctan(y/x), now only y/x is calculated, which is possible as y is very small and x is very large. This calculation increases the accuracy of the decimal place of the overall angular coordinate. The calculation performed by the second stage may yield the result in rad so that, via a further table, the obtained value is transformed from the rad format into the $2^x$ format, for allowing a final addition of the results from the first stage and the second stage yielding the final angular coordinate. The second stage processing may include the second half of the iterations that would have been used in a conventional cordic algorithm, however, the iterations are simplified and may correspond to a quasi-division (approximation of a power series by a straight line).

FIG. 6A shows an intermediate processing of the coordinate values output by the first stage in FIG. 3 for defining initial values for the iterative process in the second stage. FIG. 6B shows an iteration block for the second half of a modified cordic iteration.

FIG. 6A shows an exemplary stage 600 for generating the initial values $Y_0$ and $X_0$ for starting the iterative process in the second stage. The stage 600 receives Y and X from the preceding stage, the signal processor that implemented the iteration using the iteration block 500; the values Y and X represent the values of x- and y-coordinates after the first iterations. The value X is not modified but is only shifted by means of the bit shifter 602 a number of digits to the right, the number of digits being determined by the number of iterations that took place in the first stage in the signal processor (see the signal processor 302 in FIG. 3). Y is supplied to the multiplexer 604 either directly or via the inverter 606, and on the basis of the most significant bit of Y either the inverted version of Y or the non-inverted version of Y is selected as the initial value $Y_0$. In other words, the left hand branch of FIG. 6A yields the absolute value of Y.

FIG. 6B shows a schematic representation of an iteration block 620 for the second half of the modified cordic algorithm. The stage 620 receives the input values $X_i$ and $Y_i$ and outputs the values for the next iteration $X_{i+1}$ and $Y_{i+1}$. A predefined number i of iterations take place. For the first iteration the input values are $Y_0$ and $X_0$ are determined by stage 600 and operate as input values for the interation block 620. The input values are supplied to a subtractor 622. In addition, $X_i$ is supplied to the bit shifter 624 shifting the binary representation of $X_i$ by one digit to the right, for generating the output value $X_{i+1}$ for the next iteration which is buffered in a buffer 626. $Y_i$, in addition to applying it to the subtractor 622, is also applied to the multiplexer 628 which also receives the output from the subtractor 622. Dependent on the most significant bit of the binary output signal of the subtractor 622 either the result of the subtraction or $Y_i$ is output as the next output value $Y_{i+1}$ that is also latched in the buffer 626. In addition, the most significant bit of the output of the subtractor 622 is inverted by inverter 630 and is output into a buffer 632 holding for each of the iterations the most significant bit for forming an i-bit word which can be used for accessing the further storage 316 for obtaining the residual or remaining angle or angular coordinate.

Figure 6C:
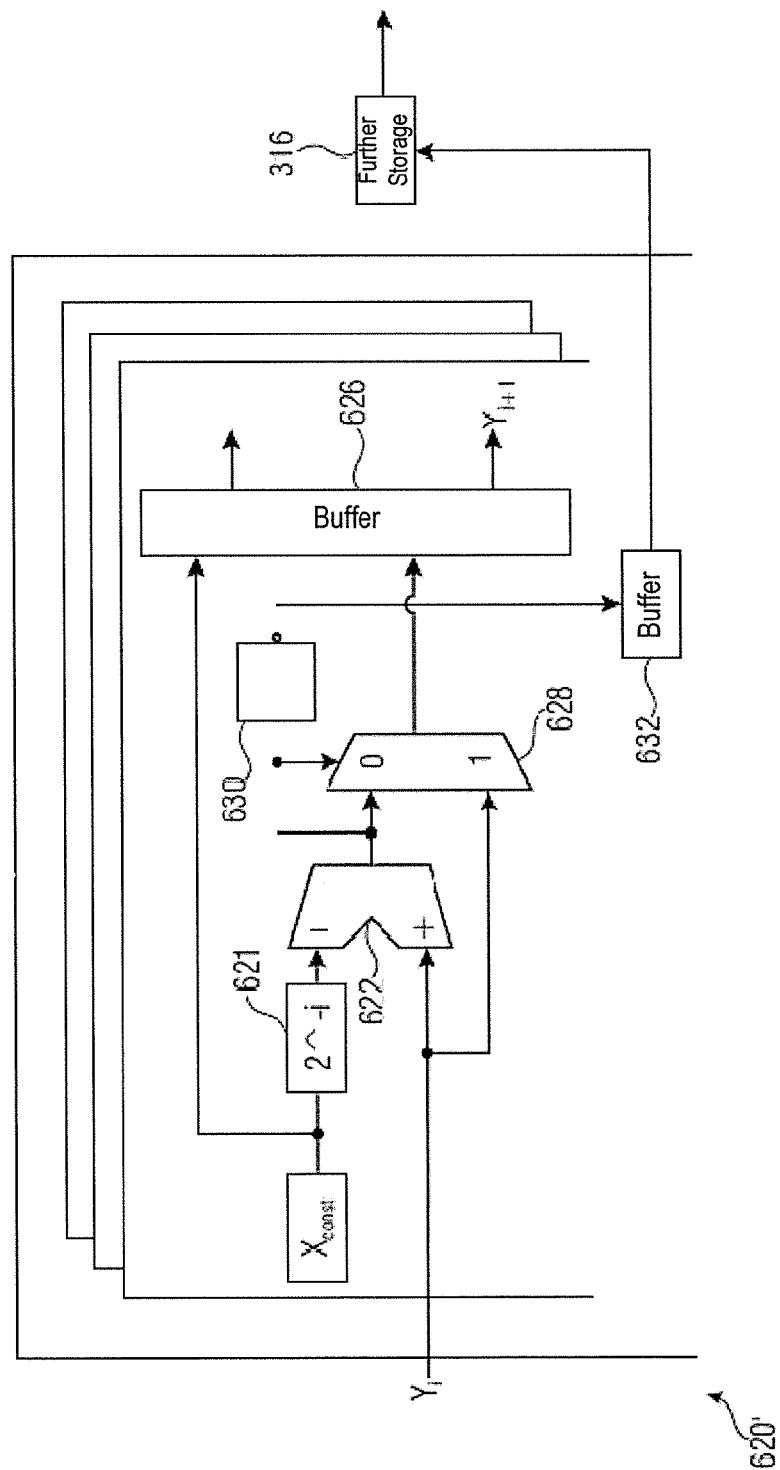
FIG. 6C shows a further example iteration block used in the second stage of the apparatus of FIG. 3 for constant input value X.

FIG. 6C shows a schematic representation of an iteration block 620' configured for calculating the next output value $Y_{i+1}$ based on a constant $X_i$ value and a variable input value $Y_i$ in the second half of iterations. Thus, it is possible to apply only one value at the input. The iteration block 620' is substantially equal to the iteration block 620 of FIG. 6A, wherein the $X_i$ input comprises a calculation element 621 for calculating the $2^{-i}$-value arranged at the $X_i$-input of the subtractor 622 and. In the case of calculating only the phase or only the radius between the constant and the variable values, there would only be one value at the output. Here, the results (signs) are buffered in the buffer 630, too, wherein the phase value is more interesting, as the accumulated values of same is stored within the table 316. After a certain number of iterations (e.g. seven iterations) the same serve as an address for the table 316 in which the accumulated phase is stored. There may also be a constant value $X_0$ in the first iterations, wherein only the value $Y_0$ would be variable.

Figure 7A:
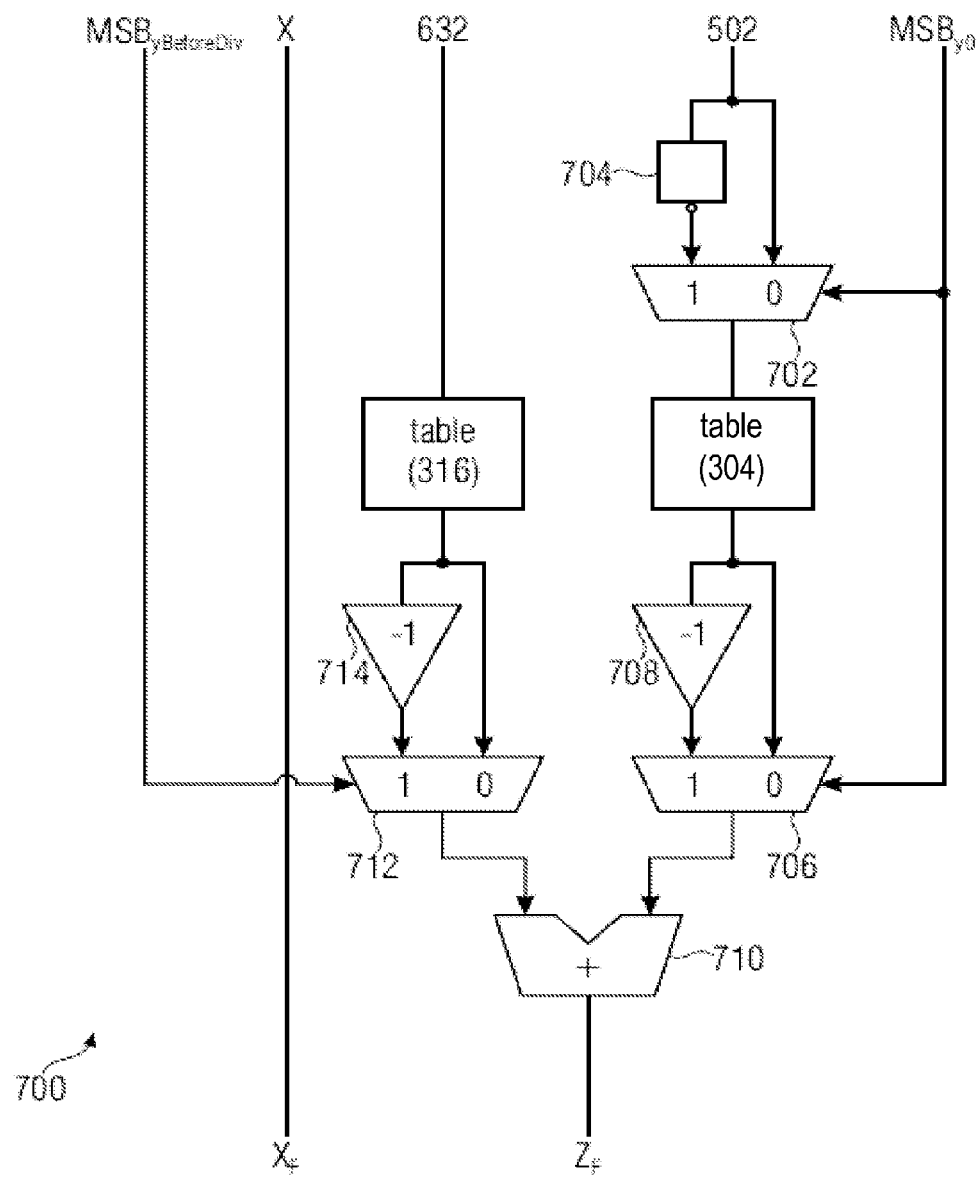
FIGS. 7A and 7B shows an example adding stages for adding the results from the two stages in FIG. 3.

The second stage may further include a stage for adding the results of the preceding stages. FIG. 7A shows an exemplary adding stage 700 receiving as input signals X as it is output by the first stage including the iteration blocks 500 shown in FIG. 5. X is directly output as the radius or radial component of the input vector. Further, the data words 502 and 632 are supplied to the respective tables holding the angular values wherein, dependent on the value of the most significant bit of the original y-coordinate via the multiplexer 702 either the word 502 or its inverted version (see inverter 704) is applied to the table 304. The output of the table 304, again dependent on the value of the most significant bit of the initial y-coordinate is supplied, via the multiplexer 706 either directly or inverted (see inverter 708) to the adder 710. The adder 710 further receives from the table 316 the remaining angular coordinate, via the multiplexer 712 either directly or in its inverted form (see inverter 714), dependent on the most significant bit of the y-coordinate before the second stage. The adder 710 outputs the final angular coordinate $Z_F$.

In the following, an example modified two stage vector mode cordic algorithm for determining the polar coordinates of an input vector described in Cartesian coordinates will be described. The polar coordinates of an input vector are calculated by iteratively turning the vector such that the y-coordinate approaches zero. The turning uses a priori known angles of decreasing value so that once the y-coordinate is within a predefined range around zero the value of the x-coordinate is the desired magnitude or radial coordinate of the input vector, and the angle or the angular coordinate is determined, as described above, by accessing a table holding predefined angular coordinate values. The following example considers an input resolution of 18 bits and an output resolution of 16 bits, and the input vector or the input signal is considered to have the following values:

$$x_{in}=45000 \; y_{in}=45000.$$

When using an ideal calculation of the magnitude would be $r_{ideal}=63640$, and the angle would be $\phi_{ideal}=45°=\pi/4$ rad$=32768$ (considering an 18 bit phase resolution).

To obtain a 16 bit output resolution, 16 iterations are required. 8 iterations will be made using the stage of FIG. 5, and then the iterative quasi-division is carried out, which also includes 8 iterations, which, however, are less costly or expensive than the second 8 iterations of the conventional cordic algorithm. The modified cordic iteration block includes only the magnitude path 402 with the additional feature of providing the most significant bits of the y-coordinate for each iteration for forming the word for accessing the table including the predefined angle values. The magnitude path 402 operates substantially in the same way as it does in a conventional cordic algorithm so that following the first 8 iterations, the output values of the first stage are as follows:

$$x_8=104798$$

$$y_8=749,$$

$$\phi=32470\approx0.7783 \text{ rad}\approx44.59°.$$

On the basis of these values, the second stage is entered for carrying out the quasi-division for determining the residual angle. As described above with regard to FIG. 6A, $x_8$ is reduced in the binary domain by the number of iterations carried out in the first stage, i.e. it is moved by a number of digits to the right, the number being determined by the number of iterations made in the first stage; in this example the binary value is shifted by 8 digits to the right. This is acceptable as these values are no longer needed for the remaining accuracy to be obtained. Further, the absolute value $y_8$ output by the first stage is obtained using the stage 600 shown in FIG. 6A.

Following stage 600 the values for the first iteration in the second stage are as follows:

$$x_8=104798 \cdot 2^{-8}{}_{10}=409_{10}$$

$$x_8=0110011001010111110_2 >> 8 = 0110011001_2$$

$$y_8=749_{10}=1011101101_2$$

These values are the starting values for the quasi-division carried out by the iteration in the second stage using stage 620 (see FIG. 6B). The first iteration yields the following results:

$$y_8-x_8=340_{10}=0101010100_2$$

$$y_9=340_{10}=0101010100_2$$
$$x_9=x_8>>1=240_{10}=011001100_2$$

$$d=1 \hspace{5em} 1.$$

The most significant bit of the subtraction $y_8-x_8$ is zero, and the output of the subtractor 622 will be forwarded, via multiplexer 628, to the buffer 626, and the value d, in view of the inverter 630 (see FIG. 6B), will have the value of 1. The further iterations 9, 10 and 11 yield the following results $$y_9-x_9=136_{10}=010001000_2$$

$$y_{10}=136_{10}=010001000_2$$
$$x_{10}=x_9>>1=102_{10}=001100110_2$$

$$d=11 \hspace{5em} 2.$$

$$y_{10}-x_{10}=34_{10}=00100010_2$$

$$y_{11}=34_{10}=00100010_2 \; x_{11}=x_{10}>>1=51_{10}=00110011_2$$

$$d=111 \hspace{5em} 3.$$

$$y_{11}-x_{11}=-17_{10}=101111_2$$

$$y_{12}=34_{10}=0100010_2 \; x_{12}=x_{11}>>1=25_{10}=011001_2$$

$$d=1110 \hspace{5em} 4.$$

As can be seen, in the fourth iteration, the new value for y is not output by the multiplexer 628 because the result of the subtraction is negative yielding the most significant bit of the subtraction $y_{11}-x_{11}$ to be "1" so that the output $y_{12}$ is the same as the input $y_{11}$. The remaining iterations yield the following results.

$$y_{12}-x_{12}=9_{10}=001001_2$$

$$y_{13}=9_{10}=001001_2 \; x_{13}=x_{12}>>1=12_{10}=001010_2$$

$$d=11101 \hspace{5em} 5.$$

$y_{13} - x_{13} = -3_{10} = 11101_2$ $y_{14} = 9_{10} = 01001_2 \, x_{14} = x_{13} \gg 1 = 6_{10} = 00110_2$ $d = 111010$    6.

$y_{14} - x_{14} = 3_{10} = 0011_2$ $y_{15} = 9_{10} = 0011_2 \, x_{15} = x_{14} \gg 1 = 3_{10} = 0011_2$ $d = 1110101$    7.

$y_{15} - x_{15} = 0_{10} = 0_2$ $y_{16} = 0_{10} = 0_2 \, x_{16} = x_{15} \gg 1 = 1_{10} = 001_2$ $d = 11101011 = 235_{10}$    8.

This terminates the quasi-division. Multiplying d with $2^{-15}$ yields a result that is approximately the difference between the calculated angular coordinate in rad and the result after the 8 conventional cordic iterations in the first stage, namely $d \cdot 2^{-15} = 235_{10} \cdot 2^{-15} = 0.0072$ rad.

d is supplied to the table 316, as described above, in which the values are given in the desired resolution, and this value is then added to the angular coordinate generated by the first stage, for yielding the final, more precise angular coordinate.

In the following, a further example modified cordic algorithm will be described which operates in accordance with the rotation mode. The modified rotation mode cordic algorithm is implemented in two stages, wherein the first stage, other than in the above described examples, is identical to the stage used in conventional cordic algorithms, i.e. the first number of iterations is done in the signal processor shown in FIG. 3 using cordic iteration stages as described with regard to FIG. 4. The second stage of the modified cordic algorithm in the rotation mode is different. In the second stage, on the basis of the output signals from the first stage, the results are calculated in a single iteration.

Figure 8:
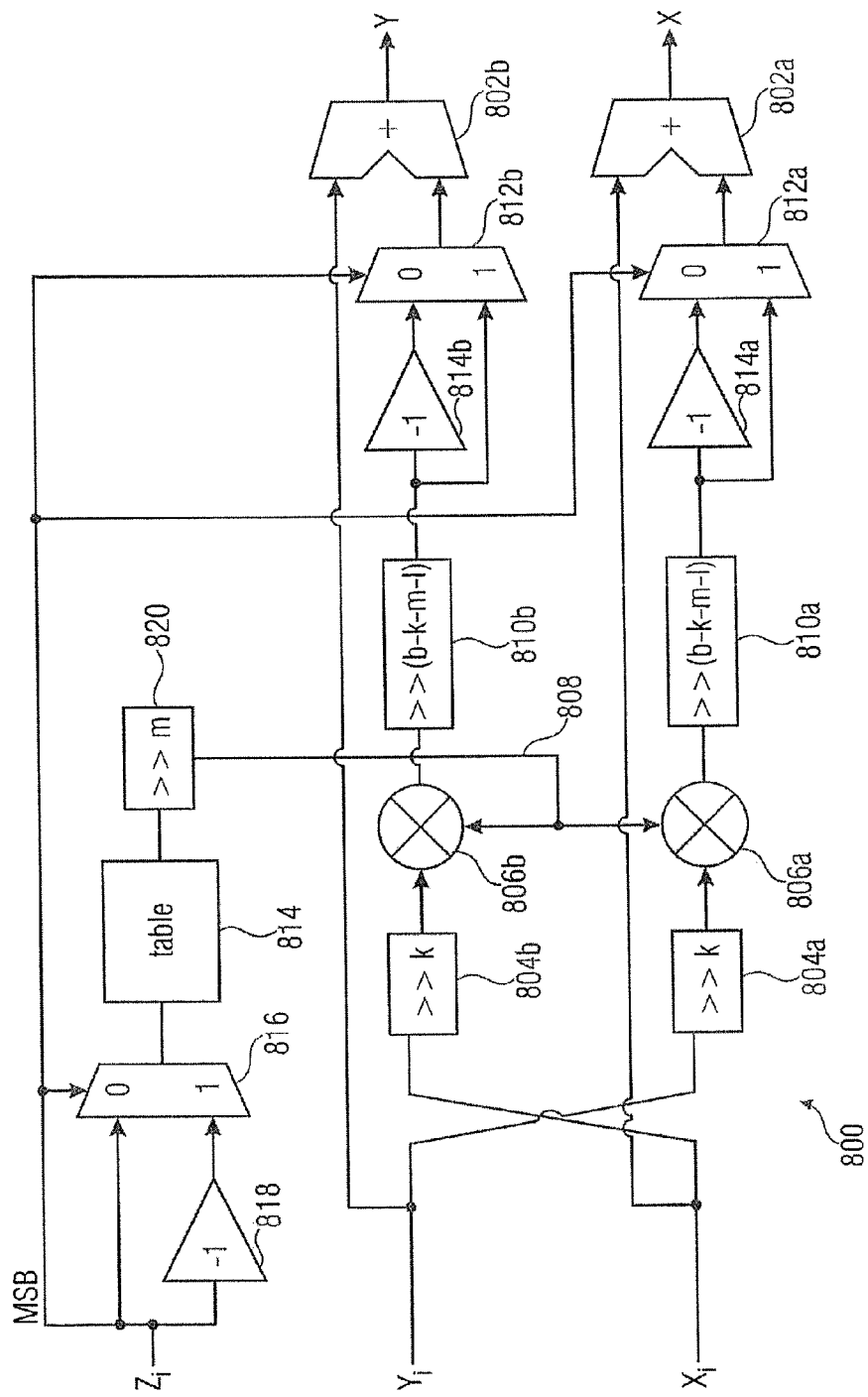
FIG. 8 shows a schematic representation of the second stage of a modified rotation mode cordic algorithm.

FIG. 8 is a schematic representation of the second stage of the modified rotation mode cordic algorithm. Stage 800 as input signals $X_i$, $Y_i$ and $Z_i$ the output values of the last iteration of the first stage (see FIG. 4). $X_i$ is directly applied to the adder 802a. $Y_i$ is applied to the bit shifter 804a shifting the binary representation of $Y_i$ by k bits to the right. The output of the shifter 804b is supplied to the multiplier 806a where it is multiplied with the signal on line 808 as will be described later. The output of the multiplier 806a is applied to a further bit shifter 810a and the output of the shifter 810a is applied to the adder 802a via the multiplexer 812a either directly or in an inverted version (see inverter 814a) dependent on the value of the most significant bit of the input $Z_i$. The adder 802a outputs the final X coordinate resulting from the rotation of the input vector by a predefined angle.

$Y_i$ is applied to a further adder 802b and $X_i$, in a similar manner as $Y_i$, is applied via the bit shifter 804b, the multiplier 806b, the bit shifter 810b, the multiplexer 812b and the inverter 814b to the adder 802b that outputs the final value for the Y coordinate.

A table 814 is addressed via the multiplexer 816 either directly by the $Z_i$ or by its inverted version (see the inverter 818). The output of the table is applied to the bit shifter 820, the output signal of which is the signal 808 is multiplied with k-bit shifted $X_i$ and k-bit shifted $Y_i$.

The table 814 associates the values $-2^n$ to $+2^n$ to respective rad values. For example, in case of having performed 8 iterations in the first stage, the phase value, when using a 18 bit word, has only a length of 10 bit. Using the MSB of $Z_i$ the absolute value of $Z_i$ is calculated so that the length of the word of the phase is only 9 bit. In the 9 bit table the rad value is translated so that when at the input of the table the value 512 is applied, the table outputs $512/2/\pi$. The table is a current saving version of this division. The value output by the table may be shifted (see shifter 820 which is optional) and it has been found out that the two multiplications by multipliers 806a and 806b can be carried out with less overhead when compared to the additional 8 iterations that would need to be carried out when using the conventional cordic algorithm.

In the following, the functionality of the stage shown in to FIG. 8 will be described. The rotation mode cordic algorithm causes an input vector described by the input variables $x_{in}$ and $y_{in}$ to be rotated by a predefined angle $\phi_n$ by turning this angle iteratively towards zero. Again, the example of an input resolution of 18 bits and an output resolution of 16 bits is considered and the input vector is considered to have the following coordinates $x_{in} = 45,000 \, y_{in} = 45,000$.

The angle $\phi_{in}$ by which the vector is to be shifted is set to be 60° which is approximately 43691 when considering an 18 bit input resolution. For a 16 bit output resolution 16 iterations are needed. As described above, in the first stage 8 normal iterations using the conventional cordic iteration blocks (FIG. 4) are carried out and, after this first stage, a multiplication is carried out to save the remaining 8 iterations. Following the first 8 iterations, the values for $x_i$, $y_i$ and $\phi_i$ are as follows:

$x_i = -26656 \, y_i = 101352 \, \phi_i = 193 \approx 0.265°$

On the basis of the value $Z_i$ the remaining angle is calculated in the rad format on the basis of the table:

$\phi_i = \text{floor}(193 \cdot \pi) = 606_{10} = 1001011110_2$

The actual calculation to obtain the rad value would be:

$$\varphi_i = \frac{193 \cdot 2\pi}{2^{18}} = \frac{193 \cdot \pi}{2^{18-1}}$$

However, this result would be smaller than 1 and, therefore, cannot be represented by integers. Also, the remaining angle, prior to the multiplication, is reduced by m=2 digits, to maintain the multiplier as small as possible (see FIG. 8), so that the value is as follows:

$\phi_i = \text{floor}(606 \cdot 2^2) = 151_{10} = 10010111_2$

For the multiplication the values $x_i$ and $y_i$ are reduced by the number of iterations in the first stage (k=8). This is possible, since the accuracy of the trailing digits for the desired output resolution of 16 bits is not needed. This yields, at the output of the shifters 804a and 804b, the following:

$\Delta x_i = \text{floor}(x_i \cdot 2^{-8}) = -105_{10} = 11100101 11_2$ $\Delta y_i = \text{floor}(y_i \cdot 2^{-8}) = 395_{10} = 0110001011_2$ After the multiplication by multipliers 806a and 806b the result must be shifted, since $\phi_i$ has not been divided by $2^{18-1}$, i.e., has not yet been shifted by 18−1 digits. When performing this shifting, however, those digits that had already been shifted need to be considered, i.e., the shifting of $2^{-2}$ and $2^{-8}$, so that the number of digits which need to be shifted is as follows:

$b - 1 - m - k = 18 - 1 - 2 - 8 = 7$

The shifters 810a and 810b perform this shifting and following this the adders 802a and 802b provide the final output coordinates X and Y so that turning the input vector by 60° is completed.

In the following, a further example modified using a hyperbolic CORDIC will be discussed. This calculation may be performed by using the cordic iteration block 500 shown in FIG. 5, wherein the multiplexer 410a is changed (in contrast to the circular VM CORDIC x and y of FIG. 5) such the two multiplexers 410a and 410b use the same sign The following basic functions may be calculated iteratively:

$$x_n = K_h(x_0^2 - y_0^2)^{1/2}$$

$$z_n = z_0 + \tan h^{-1} y_0/x_0$$

From the same further functions may be derived, thus tan $h^{-1}$ may be transformed into $$\tanh^{-1} y_0/x_0 = 0.5 \cdot \ln\left(\frac{1 + y_0/x_0}{1 - y_0/x_0}\right) = 0.5 \cdot \ln\left(\frac{x_0 + y_0}{x_0 - y_0}\right)$$

If you put $x_0 = x+1$ and $y_0 = x-1$, for $z_n$ with $z_0 = 0$ the following results $$z_n = 0.5 \cdot \ln\left(\frac{x_0 + y_0}{x_0 - y_0}\right) = 0.5 \cdot \ln(x)$$

Thus, the natural logarithm may be calculated. Using the following relation $$\log_b x = \frac{\log_a x}{\log_a b}$$

also any other logarithmic functions may be calculated. No additional division has to be done, the accumulated table values only have to be weighted.

Regarding its setup, the hyperbolic CORDIC is similar to the circular one, the individual iterations of FIG. 2 look almost the same. One difference is, that x and y are changed using the same sign, apart from that some iterations have to be repeated in order to guarantee the hyperbolic phase to converge towards zero.

Apart from that, in each iteration for the phase always the same values tan $h^{-1}(2^{-i})$ are added or subtracted, so that a table with the accumulated values may be used.

Like in the circular CORDIC, the x value is converged after half of the necessary iterations and tan $h^{-1} y_0/x_0 \approx y_0/x_0$, as $y_0/x_0$ is very small. This already applies after one third of the iterations. Thus, here the iterative division is used.

Figure 7B:
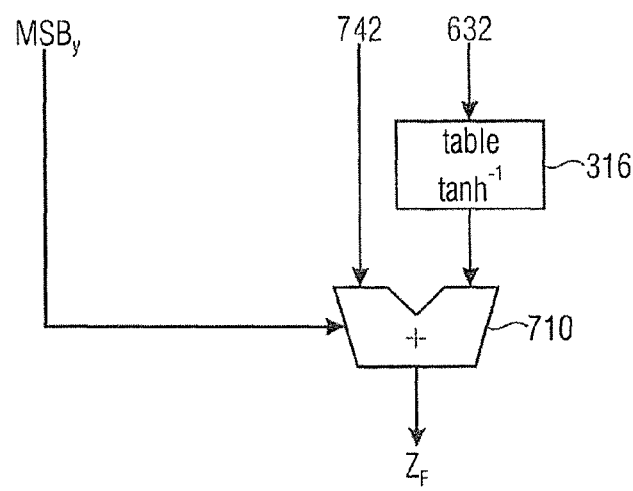

In contrast to the circular CORDIC, after the division iterations no conversion into the correct scale has to be executed, as the hyperbolic phase is not converted to the used word length, as same has no periodicity. Thus, the result of the two iterations may be added. This summation is illustrated by FIG. 7B. FIG. 7B shows an example an adding stage 700' receiving data words 742 and 632. The data word 742, comprising the result of the division, is directly supplied to the adder 710, wherein the data word 632 is supplied to the table 316 holding the tan $h^{-1}$ values. The adder 710 adds, dependent on the most significant bit of the y-coordinate, the result of the division 742 and the to the accumulated tan $h^{-1}$ values received from the table in order to output the final angular coordinate $Z_F$.

As an example, the natural algorithm and the root of x=45000 is to be calculated, the CORDIC here has an internal word length of 18 bits and an output word length of 16 bits. Due to the small convergence radius (sum of all angles) $2^{16}$ is interpreted to be 1, but as the actual logarithm is to be calculated, a conversion has to be executed, so that $2^{16}$ may be interpreted as one.

$$\ln(x) = \ln(M \cdot 2^E) = E \cdot \ln(2) + \ln(M)$$

M is a number between 0.5 and 2, with $2^{16}$ being 1 it is fulfilled with respect to x. E still has to be determined, as the actual logarithm is wanted. This may easily be realized with respect to hardware. For x=45000, E=16. As the output word length is 16 bits, E may also take on only 16 different values, i.e. $E \cdot \ln(2)$ may be stored in a small table.

As indicated above, $x_0 = x+1$ and $y_0 = x-1$ have to be calculated, with 1 being $2^{16}$ the following applies for the input of the hyperbolic CORDIC $x_0 = 110536$ $y_0 = -20536$. After eight iterations, the x value is converged and the result is $x_8 = 89949$ $y_8 = 334$. The accumulated tan $h^{-1}(2^{-i}) \cdot 2^{17}$ values correspond to $\phi^8 = -25125$. Then, division iterations follow, and the result of the same is added to $\phi_8$ and the following results $\phi_{16} = -24631$.

The logarithm is not yet completed, as mentioned above, still $E \cdot \ln(2)$ has to be included. To be able to better utilize the given word length, $E \cdot \ln(2)$ and $\ln(M)$ are amplified differently, and this has to be noted in the addition. At the output for the logarithm the following is applied $\phi_{out} = 87773$.

If the amplification of $2^{13}$ is eliminated, the following results $\phi_{in} = 87773 \cdot 2^{-13} = 10.7145$.

If the natural logarithm is ideally calculated, the following results $\ln(45000) = 10.7144$.

Thus, the approximation using the hyperbolic CORDIC is very accurate. In general, only the iterations may be executed and the sign of y may be memorized and subsequently be read out of a memory, and the result would be the same.

It is noted that FIG. 3 showed two different blocks 302 and 314 for implementing the modified algorithm. Alternatively, the blocks 302 and 314 may be formed by a single processor.

Further, the modified cordic algorithms may also be implemented on the basis of hyperbolic cordics.

Figure 9:
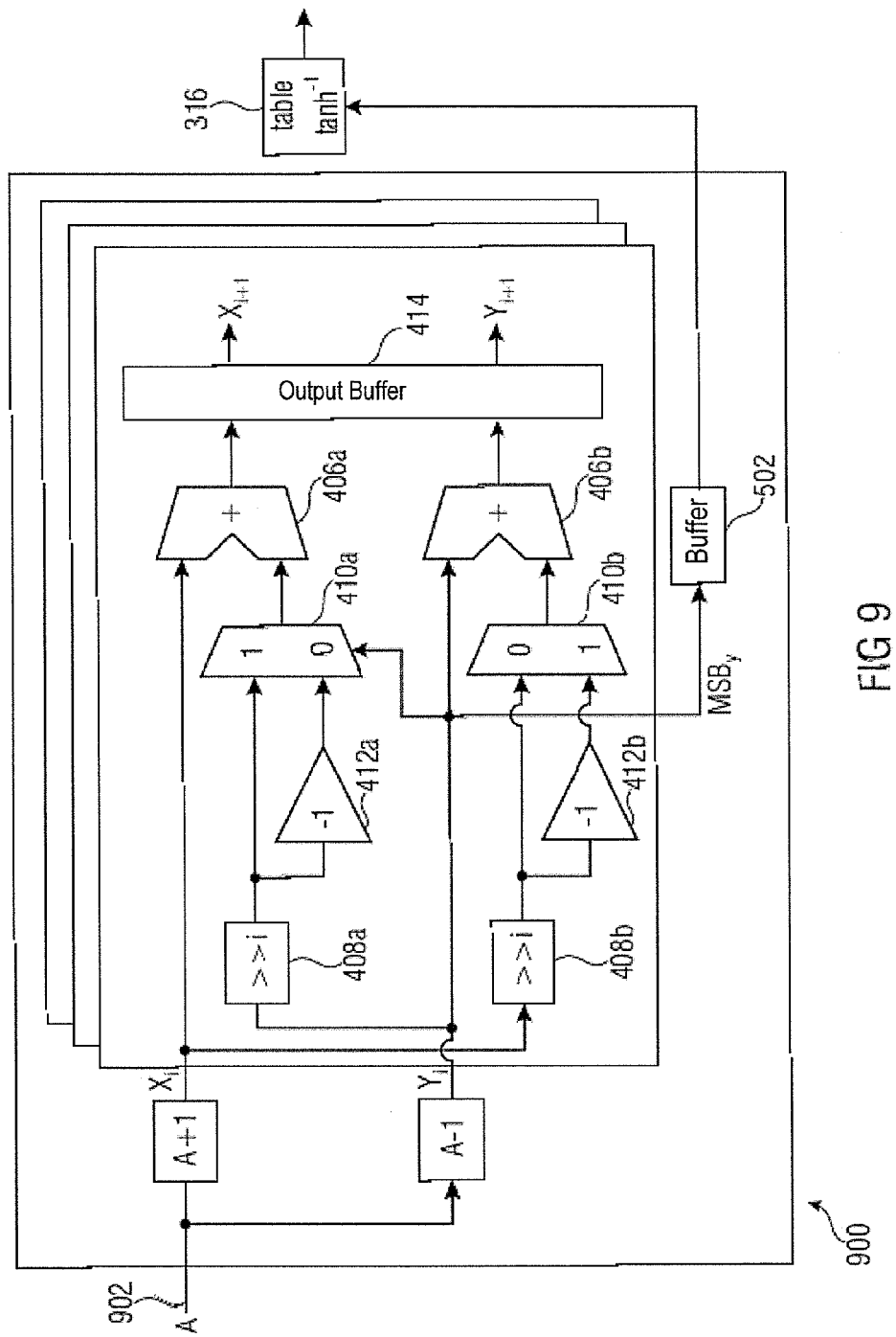
FIG. 9 shows another example modified cordic iteration block of an apparatus for determining a logarithmic function.

FIG. 9 shows a further implementation of a modified cordic iteration block 900 for logarithm computation. The modified cordic iteration block 900 corresponds substantially to the cordic iteration block 500 shown in FIG. 5, wherein only one value a is applied at the input 902 of the cordic block 900. Thus, the input 902 is coupled to the $X_i$ input via a A+1-calculation element 904a and to the $Y_i$ input via a A-1-calculation element 904b. The basic functionality of the cordic block 900 corresponds to the cordic block 500 of FIG. 5, wherein the calculation of the cordic block 900 is performed based on the one value A provided to the input 902.

Also, it is noted that the adding stage of FIG. 7A may be a further stage in addition to the two stages shown in FIG. 3, or, alternatively, it may be implemented, at least in part, in one of the two stages or in both stages in FIG. 3.

Referring to FIG. 3 it should be noted that the achievable accuracy depends on the number of iterations. Therefore, the number of iterations may be varied during performing the calculation in order to achieve a sufficient accuracy in a short processing time. Therefore the signal processor 302 may, according to another implementation, be configured to turn iteratively the input vector until one of the Cartesian coordinates, for example the y-coordinate, is within a predefined range around a threshold value, for example zero.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like a microprocessor, a programmable computer or an electronic circuit. Some one or more of the most important method steps may be executed by such an apparatus.

The implementation may be in hardware or in software or may be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. A data carrier may be provided which has electronically readable control signals, which are capable of cooperating with a programmable computer system, such that the method described herein is performed.

The implementation may also be in the form of a computer program product with a program code, the program code being operative for performing the method when the computer program product runs on a computer. The program code may be stored on a machine readable carrier. Bellow, an example cordic code is illustrated for the first half of the iterations:

```
Storage=Table[0,{17}]; LutPhase=Round[Table[ ArcTan[1./2.^i],{i,0,16}]
65536]
{51472,30386,16055,8150,4091,2047,1024,512,256,128,64,32,16,8,4,2,1}
ArcTan[20000.,11200.] 65536
33455.4
xreal=20000.; ximag=11200.; xrn=0.;xin=0.;
t1=Table[ If[xreal>0,
xrn=xreal-ximag*2^(-i);
xin=ximag+xreal*2^(-i);
Storage[[1+i]]=-1,
xrn=xreal+ximag*2^(-i);
xin=ximag-xreal*2^(-i);
Storage[[1+i]]=1;
];
{i,xreal=xrn, ximag=xin, Storage}, {i,0,16}];
MatrixForm[t1]
(_{
{0, 8800., 31200., {-1,0,0,0,0,0,0,0,0,0,0,0,0,0,0,0,0}},
{1, -6800., 35600., {-1,-1,0,0,0,0,0,0,0,0,0,0,0,0,0,0,0}},
{2, 2100., 37300., {-1,-1,1,0,0,0,0,0,0,0,0,0,0,0,0,0,0}},
{3, -2562.5, 37562.5, {-1,-1,1,-1,0,0,0,0,0,0,0,0,0,0,0,0,0}},
{4, -214.844, 37722.7, {-1,-1,1,-1,1,0,0,0,0,0,0,0,0,0,0,0,0}},
{5, 963.989, 37729.4, {-1,-1,1,-1,1,1,0,0,0,0,0,0,0,0,0,0,0}},
{6, 374.468, 37744.4, {-1,-1,1,-1,1,1,-1,0,0,0,0,0,0,0,0,0,0}},
{7, 79.5895, 37747.4, {-1,-1,1,-1,1,1,-1,-1,0,0,0,0,0,0,0,0,0}},
{8, -67.8611, 37747.7, {-1,-1,1,-1,1,1,-1,-1,-1,0,0,0,0,0,0,0,0}},
{9, 5.86477, 37747.8, {-1,-1,1,-1,1,1,-1,-1,-1,1,0,0,0,0,0,0,0}},
{10, -30.9983, 37747.8, {-1,-1,1,-1,1,1,-1,-1,-1,1,-1,0,0,0,0,0,0}},
{11, -12.5668, 37747.8, {-1,-1,1,-1,1,1,-1,-1,-1,1,-1,1,0,0,0,0,0}},
{12, -3.35099, 37747.8, {-1,-1,1,-1,1,1,-1,-1,-1,1,-1,1,1,0,0,0,0}},
{13, 1.25689, 37747.8, {-1,-1,1,-1,1,1,-1,-1,-1,1,-1,1,1,1,0,0,0}},
{14, -1.04705, 37747.8, {-1,-1,1,-1,1,1,-1,-1,-1,1,-1,1,1,1,-1,0,0}},
{15, 0.104923, 37747.8, {-1,-1,1,-1,1,1,-1,-1,-1,1,-1,1,1,1,-1,1,0}},
{16, -0.471064, 37747.8, {-1,-1,1,-1,1,1,-1,-1,-1,1,-1,1,1,1,-1,1,-1}}
}_)
Round[ArcTan[1.]65536 2]+Storage.LutPhase
33454
```

Bellow, the code for the second half of the iterations is shown:

```
Storage=Table[0,{17}];LutPhase=Round[Table[ ArcTan[1./2.^i],{i,0,1 6}] 65536]
{51472,30386,16055,8150,4091,2047,1024,512,256,128,64,32,16,8,4,2,1}
xreal=5.864769886898102;
t1=Table[ If[xreal>0,
xrn=xreal-37747.8*2^(-i);
Storage[[1+i]]=-1,
xrn=xreal+37747.8*2^(-i);
Storage[[1+i]]=1;
];
{i,xreal=xrn, Storage},{i,10,16}];
MatrixForm[t1]
(_{
{10, -30.9983, {0,0,0,0,0,0,0,0,0,0,-1,0,0,0,0,0,0}},
{11, -12.5668, {0,0,0,0,0,0,0,0,0,0,-1,1,0,0,0,0,0}},
{12, -3.351, {0,0,0,0,0,0,0,0,0,0,-1,1,1,0,0,0,0}},
{13, 1.25688, {0,0,0,0,0,0,0,0,0,0,-1,1,1,1,0,0,0}},
{14, -1.04706, {0,0,0,0,0,0,0,0,0,0,-1,1,1,1,-1,0,0}},
{15, 0.104913, {0,0,0,0,0,0,0,0,0,0,-1,1,1,1,-1,1,0}},
{16, -0.471073, {0,0,0,0,0,0,0,0,0,0,-1,1,1,1,-1,1,-1}}
}_)
```

The invention claimed is:

1. A method of a polar transmitter, comprising:
   receiving, via the polar transmitter, a first input value and a second input value;
   iteratively calculating, via a signal processor, a combination of intermediate values during a plurality of iterations based on the first input value and the second input value, and calculating a first output value;
   buffering, using a buffer storage coupled to the signal processor, the intermediate values corresponding to the plurality of iterations, respectively;
   accessing the buffer storage, via the signal processor, and based on the combination of the intermediate values of the buffer storage, storing a plurality of output values associated with combinations of the intermediate values of the buffer storage;
   outputting, via the signal processor, a second output value of the plurality of first output values and the first output value;
   iteratively turning, via the signal processor, an input vector described by the first input value and the second input value, represented in Cartesian coordinates, using known angles in order to output one of the Cartesian coordinates representing a radial coordinate of the input vector as the first output value, wherein, during an iteration of the plurality of iterations, an intermediate value of any of the combination of intermediate values is set dependent on a rotation direction into which the input vector is turned, for generating the combination of intermediate values;
   based on the combination of intermediate values, obtaining, via the signal processor, an angular coordinate of the input vector from the buffer storage, wherein the outputting of the second output value comprises outputting the angular coordinate;
   calculating, via a further processing stage to provide an increased accuracy, a remaining angular coordinate of the turned input vector based on the values of the Cartesian coordinates by iteratively generating a quasi division that comprises an approximation of a power series by a straight line via another plurality of iterations based on the Cartesian coordinates of the turned input vector after completing the plurality of iterations; and
   adding, via the further processing stage, the remaining angular coordinate to the angular coordinate obtained from the buffer storage.

2. The method of claim 1, wherein the iteratively calculating comprises sequentially performing the plurality of iterations by the signal processor.

3. The method of claim 1, wherein a predefined range is set based on a desired accuracy of the radial coordinate of the input vector.

4. The method of claim 1, wherein the Cartesian coordinates comprise an x-coordinate and a y-coordinate, wherein the input vector is iteratively turned until the y-coordinate is within a predefined range around zero, and wherein at one or more iterations of the plurality of iterations the angle by which the input vector is turned is decreased.

5. The method of claim 4, wherein the Cartesian coordinates of the input vector are represented in binary format, wherein the iteratively turning the input vector comprises using a modified vector mode coordination rotation digital computer (CORDIC) algorithm operating on the basis of the x-coordinate and the y-coordinate, and wherein a most significant bit of the y-coordinate indicates an intermediate direction value for the iteration.

6. The method of claim 1, wherein at iterations corresponding to the quasi division, an access value is set, for generating a set of access values, and wherein based on the set of access values, the remaining angular coordinate of the turned input vector is obtained from a further storage further holding a plurality of remaining angular coordinates that are respectively associated with different sets of access values.

7. The method of claim 6, wherein the angular coordinates are stored in a first format that is different from a second format in which the remaining angular coordinates are stored, and wherein adding comprises transforming the remaining angular coordinate into the first format.

8. The method of claim 6, wherein a storage comprises the buffer storage holding the angular coordinates and the further storage holding the remaining angular coordinates.

9. The method of claim 1, wherein the Cartesian coordinates are represented in binary format, wherein the iteratively turning the input vector comprises using a modified vector mode coordination rotation digital computer (CORDIC) algorithm operating based on the x-coordinate and the y-coordinate, and wherein the iteratively generating the quasi division, during the iteration of the plurality of iterations, comprises:
   subtracting the x-coordinate value of a previous iteration from the y-coordinate value of the previous iteration;
   selecting a new y-coordinate value to be a result of the subtracting, in case the result of the subtraction is positive, or to be the y-coordinate value of the previous iteration, in case the result of the subtracting is negative; and
   obtaining a new x-coordinate value by shifting the x-coordinate value of the previous iteration to the right by one digit.

10. The method of claim 9, wherein the iteratively generating the quasi division starts with an initial x-coordinate value obtained by shifting the x-coordinate value of the turned input vector to the right by a number of digits, the number being determined by the number of iterations for turning the input vector, and wherein the iteratively generating the quasi division comprises starting with an initial y-coordinate value which is the absolute value of the y-coordinate value of the turned input vector.

11. A method for providing a transmit signal to be sent via a polar transmitter, the method comprising:
   receiving, via a signal processor of the polar transmitter, an input signal in binary format and represented in Cartesian x- and y-coordinates, the input signal describing an input vector;
   iteratively turning, at a plurality of iterations via the signal processor, the input vector using known decreasing angles by using a modified vector mode coordination rotation digital computer (CORDIC) algorithm operating based on the x-coordinate and the y-coordinate until the y-coordinate is within a predefined range around zero so that the x-coordinate represents a radial coordinate of the input vector, wherein for an iteration of the plurality of iterations a most significant bit of the y-coordinate indicates a rotation direction value, for generating a set of rotation direction values;

based on the set of rotation direction values, obtaining, via the signal processor, an angular coordinate of the input vector from a buffer storage holding a plurality of angular coordinates that are associated with different sets of rotation direction values, respectively;

calculating, via a further processing stage to increase an accuracy, a remaining angular coordinate by iteratively performing a quasi division that comprises an approximation of a power series by a straight line via another plurality of iterations based on the Cartesian coordinates of the turned input vector, wherein during iterations of the quasi division an access value is set, for generating a set of access values;

based on the set of access values, obtaining, via the further processing stage, the remaining angular coordinate of the turned input vector from a further storage further holding a plurality of remaining angular coordinates associated with different sets of access values respectively;

adding, via the further processing stage, the remaining angular coordinate to the angular coordinate obtained from the further storage; and controlling, via the polar transmitter, a transmit stage of the polar transmitter based on the determined radial and angular coordinate values to provide a transmit signal in accordance with the input signal.

12. A polar transmitter for determining at least one output value based on at least one input value, comprising:

a signal processor configured to iteratively calculate a combination of intermediate values calculated during a plurality of iterations based on the at least one input value;

a buffer storage, coupled to the signal processor, configured to buffer intermediate values of the combination of intermediate values calculated during the plurality of iterations;

wherein the buffer storage is further configured to store a plurality of first output values associated with a combination of the buffered intermediate values, respectively, and comprising a storage controller configured to access the buffer storage based on the combination of the intermediate values buffered in the buffer storage and to output a first output value of the plurality of first output values;

wherein the signal processor is further configured to:
iteratively turn an input vector defined by at least one first input value and at least one second input value of the at least one input value, represented in Cartesian coordinates, using known angles in order to output one of the Cartesian coordinates representing a radial coordinate of the input vector as the first output value, wherein, during an iteration of the plurality of iterations, an intermediate value is set dependent on a rotation direction into which the input vector is turned, for generating the combination of intermediate values;

based on the combination of intermediate values, obtain an angular coordinate of the input vector from the buffer storage, and output a second output value comprising the angular coordinate; and a further processing stage coupled to the signal processor and configured to calculate, to provide an increased accuracy, a remaining angular coordinate of the turned input vector based on the values of the Cartesian coordinates by iteratively generating a quasi division that comprises an approximation of a power series by a straight line in another plurality of iterations based on the Cartesian coordinates of the turned input vector after completing the plurality of iterations.

13. The polar transmitter of claim 12, wherein the buffer storage is a read only memory storage.

14. A polar transmitter for determining the polar coordinates of an input vector described by an input signal represented in Cartesian coordinates, the polar transmitter comprising:

a buffer storage holding a plurality of angular coordinates, wherein each angular coordinate is associated with a different set of rotation direction values; and a signal processor, coupled to the buffer storage, configured to:
iteratively turn, at a plurality of iterations, the input vector using known angles until one of the Cartesian coordinates is within a predefined range around a threshold value;

output the other one of the Cartesian coordinates as a radial coordinate of the input vector;

access the buffer storage based on a set of rotation direction values to obtain an angular coordinate of the plurality of angular coordinates; and a further processing stage coupled to the signal processor and configured to calculate, to increase an accuracy of the plurality of angular coordinates, a remaining angular coordinate of the turned input vector based on the Cartesian coordinates by iteratively generating a quasi division that comprises an approximation of a power series by a straight line via another plurality of iterations based on the Cartesian coordinates of the turned input vector and output the angular coordinate of the turned input vector read from the buffer storage.

15. A polar transmitter, comprising:

an input configured to provide an input signal in binary format and represented in Cartesian x- and y-coordinates, the input signal describing an input vector;

a coordination rotation digital computer (CORDIC) processor, comprising:
a buffer storage;
a signal processor, communicatively coupled to the buffer storage, configured to:
iteratively turn the input vector using known decreasing angles in accordance with one or more modified vector mode CORDIC processes operating based on an x-coordinate and a y-coordinate until the y-coordinate is within a predefined range around zero;

output the x-coordinate as a radial coordinate of the input vector;

set, for a plurality of iterations, a most significant bit of the y-coordinate as a rotation direction value, for generating a set of rotation direction values; and access the buffer storage based on the set of rotation direction values, the buffer storage holding a plurality of angular coordinates associated with different sets of rotation direction values respectively, for obtaining an initial angular coordinate of the input vector;

a further processing stage coupled to the signal processor and configured to:

calculate, to increase an accuracy of the plurality of angular coordinates, a remaining angular coordinate of the turned input vector based on the Cartesian coordinates by iteratively generating, in a second plurality of iterations, a quasi division that comprises an approximation of a power series by a straight line based on the Cartesian coordinates of the turned input vector;

set for a plurality of iterations of the quasi division an access value, for generating a set of rotation direction values;

access a further storage based on the access value, the further storage further holding a plurality of remaining angular coordinates associated with different access values, for obtaining a remaining angular coordinate of the turned input vector;

add the remaining angular coordinate to the initial angular coordinate obtained; and output the added remaining and initial angular coordinates as the angular coordinate of the input vector; and a transmit stage configured to provide a transmit signal in accordance with the input signal based on the radial and angular coordinate values output by the CORDIC processor.

16. The polar transmitter of claim 15, wherein the iteratively generating the quasi division comprises:
subtracting the x-coordinate value of a previous iteration from the y-coordinate value of the previous iteration.

17. The polar transmitter of claim 16, wherein the iteratively generating the quasi division further comprises:
selecting a new y-coordinate value to be a result of the subtracting, in case the result of the subtraction is positive, or to be the y-coordinate value of the previous iteration, in case the result of the subtracting is negative.

18. The polar transmitter of claim 17, wherein the iteratively generating the quasi division further comprises:
obtaining a new x-coordinate value by shifting the x-coordinate value of the previous iteration to the right by one digit.

* * * * *